United States Patent
Porez et al.

(10) Patent No.: US 9,174,725 B2
(45) Date of Patent: Nov. 3, 2015

(54) SYSTEMS FOR TASKS GUIDANCE OF OPERATIONS MANAGEMENT IN AN AIRCRAFT COCKPIT

(71) Applicant: Airbus Operations SAS, Toulouse (FR)

(72) Inventors: Stephane Porez, Quint-Fonsegrives (FR); Guillaume Calvet-Inglada, Toulouse (FR); Bruno Doveil, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 239 days.

(21) Appl. No.: 13/905,914

(22) Filed: May 30, 2013

(65) Prior Publication Data

US 2014/0200748 A1 Jul. 17, 2014

(30) Foreign Application Priority Data

Jan. 11, 2013 (FR) .................................. 13 50247

(51) Int. Cl.
*G06G 7/00* (2006.01)
*B64C 19/00* (2006.01)
*G05B 15/02* (2006.01)

(52) U.S. Cl.
CPC ................. *B64C 19/00* (2013.01); *G05B 15/02* (2013.01)

(58) Field of Classification Search
CPC ................................ B64C 19/00; G05B 15/02
See application file for complete search history.

(56) References Cited

U.S. PATENT DOCUMENTS

| | | | |
|---|---|---|---|
| 812,174 | A | 2/1906 | Grundal |
| 4,538,229 | A | 8/1985 | Baltzer et al. |
| 5,842,142 | A | 11/1998 | Murray et al. |
| 5,978,715 | A | 11/1999 | Briffe et al. |
| 6,072,473 | A | 6/2000 | Muller et al. |
| 6,181,987 | B1 | 1/2001 | Deker et al. |
| 6,236,913 | B1 * | 5/2001 | Bomans et al. ................... 701/3 |
| 6,353,734 | B1 | 3/2002 | Wright et al. |
| 6,573,841 | B2 | 6/2003 | Price |
| D517,435 | S | 3/2006 | Yamada |

(Continued)

FOREIGN PATENT DOCUMENTS

| | | |
|---|---|---|
| EP | 0562929 | 9/1993 |
| EP | 2063227 | 5/2009 |
| FR | 2 694 104 | 1/1994 |

OTHER PUBLICATIONS

Non-Final Office Action for U.S. Appl. No. 13/861,052 dated Feb. 14, 2014.

(Continued)

*Primary Examiner* — Mary Cheung
(74) *Attorney, Agent, or Firm* — Jenkins, Wilson, Taylor & Hunt, P.A.

(57) ABSTRACT

Aircraft guidance assistance systems and computer readable media are disclosed. The present subject matter includes systems and computer readable media for providing task guidance for managing flight operations during normal operating procedures or exceptional situations caused by abnormal events. In some aspects, a system for providing task guidance can include a processor, memory, and a flight assistance module configured to receive data from multiple servers. The assistance module can display possible aircraft flight phases while indicating the flight phase. The assistance module can also display operations to be carried out for the flight phases, and the actions corresponding to these operations.

17 Claims, 3 Drawing Sheets

(56) References Cited

U.S. PATENT DOCUMENTS

| | | | |
|---|---|---|---|
| D559,260 S | 1/2008 | Noviello | |
| D563,977 S | 3/2008 | Carl et al. | |
| 7,343,229 B1 | 3/2008 | Wilson | |
| D579,458 S | 10/2008 | Nash et al. | |
| 7,577,501 B2 | 8/2009 | Tafs et al. | |
| D615,100 S | 5/2010 | Canu-Chiesa | |
| 7,751,948 B2 | 7/2010 | Boorman et al. | |
| 7,830,275 B2 | 11/2010 | Hiraoka | |
| D634,332 S | 3/2011 | van der Spek | |
| 7,996,121 B2 | 8/2011 | Ferro et al. | |
| D644,651 S | 9/2011 | van der Spek | |
| D644,652 S | 9/2011 | van der Spek | |
| D644,653 S | 9/2011 | van der Spek | |
| D646,689 S | 10/2011 | Ulliot | |
| 8,078,343 B2 | 12/2011 | Ferreira et al. | |
| 8,108,087 B2 | 1/2012 | Stone et al. | |
| 8,217,807 B1* | 7/2012 | Carrico | 340/971 |
| 8,234,068 B1 | 7/2012 | Young et al. | |
| 8,290,642 B2 | 10/2012 | Hanson | |
| 8,311,686 B2 | 11/2012 | Herkes et al. | |
| 8,380,366 B1 | 2/2013 | Schulte et al. | |
| 8,493,240 B1* | 7/2013 | Carrico | 340/971 |
| 2003/0060940 A1 | 3/2003 | Humbard et al. | |
| 2004/0006412 A1 | 1/2004 | Doose et al. | |
| 2005/0065671 A1 | 3/2005 | Horvath et al. | |
| 2005/0273220 A1 | 12/2005 | Humbard et al. | |
| 2006/0132460 A1 | 6/2006 | Kolmykov-Zotov et al. | |
| 2007/0129855 A1 | 6/2007 | Coulmeau | |
| 2007/0182590 A1 | 8/2007 | Younkin | |
| 2008/0046134 A1 | 2/2008 | Bruce et al. | |
| 2008/0243318 A1 | 10/2008 | Ferro et al. | |
| 2008/0249675 A1 | 10/2008 | Goodman et al. | |
| 2009/0070123 A1 | 3/2009 | Wise et al. | |
| 2009/0105890 A1 | 4/2009 | Jones et al. | |
| 2009/0118997 A1 | 5/2009 | Truitt | |
| 2009/0281684 A1 | 11/2009 | Spek | |
| 2010/0010958 A1 | 1/2010 | Perrow et al. | |
| 2010/0156674 A1 | 6/2010 | Dwyer et al. | |
| 2010/0161157 A1 | 6/2010 | Guilley et al. | |
| 2010/0305786 A1 | 12/2010 | Boorman | |
| 2010/0324807 A1 | 12/2010 | Doose et al. | |
| 2011/0029919 A1 | 2/2011 | Woltkamp | |
| 2011/0118908 A1* | 5/2011 | Boorman et al. | 701/14 |
| 2011/0184595 A1 | 7/2011 | Albert | |
| 2011/0196599 A1 | 8/2011 | Feyereisen et al. | |
| 2011/0199239 A1 | 8/2011 | Lutz | |
| 2011/0208374 A1 | 8/2011 | Jayathirtha et al. | |
| 2011/0213514 A1 | 9/2011 | Baxter | |
| 2011/0246015 A1 | 10/2011 | Cummings et al. | |
| 2011/0264312 A1 | 10/2011 | Spinelli et al. | |
| 2011/0313645 A1 | 12/2011 | Shukla | |
| 2012/0105318 A1 | 5/2012 | Nutaro et al. | |
| 2012/0116614 A1 | 5/2012 | Torres et al. | |
| 2012/0215433 A1 | 8/2012 | Subbu et al. | |
| 2012/0253564 A1 | 10/2012 | Noll et al. | |
| 2013/0046462 A1 | 2/2013 | Feyereisen et al. | |
| 2013/0090841 A1 | 4/2013 | Barraci et al. | |
| 2013/0100042 A1 | 4/2013 | Kincaid | |
| 2013/0135202 A1 | 5/2013 | Louise-Babando | |
| 2013/0179011 A1 | 7/2013 | Colby et al. | |
| 2013/0204524 A1 | 8/2013 | Fryer et al. | |
| 2013/0211635 A1 | 8/2013 | Bourret | |
| 2013/0215023 A1 | 8/2013 | Bourret | |
| 2013/0278444 A1 | 10/2013 | Venkataswamy et al. | |

OTHER PUBLICATIONS

Final Office Action for U.S. Appl. No. 13/861,052 dated Jun. 16, 2014.
Restriction Requirement for U.S. Appl. No. 13/835,506 dated Mar. 27, 2014.
Restriction Requirement for U.S. Appl. No. 29/449,551 dated Apr. 9, 2014.
Non-Final Office Action for U.S. Appl. No. 13/687,729 dated Jul. 18, 2014.
Notice of Allowance for U.S. Appl. No. 29/449,551 dated Jul. 18, 2014.
Non-Final Office Action for U.S. Appl. No. 13/835,506 dated Jun. 26, 2015.
Non-Final Office Action for U.S. Appl. No. 13/835,201 dated Jun. 27, 2014.
French Search Report for FR 1160884 dated Jul. 5, 2012.
French Search Report for FR 1350247 dated Nov. 22, 2013.

* cited by examiner

SYSTEMS FOR TASKS GUIDANCE OF OPERATIONS MANAGEMENT IN AN AIRCRAFT COCKPIT

CROSS-REFERENCE TO RELATED APPLICATION

This application claims priority to French Patent Application No. 13 50247 filed on Jan. 11, 2013, the entire content of which is incorporated by reference herein.

TECHNICAL FIELD

The subject matter described herein relates generally to systems for assisting the guidance of actions during operation of an aircraft. More particularly, the subject matter disclosed herein relates systems for management of aircraft operation as carried out by an operator of an aircraft.

BACKGROUND

During general operation of an aircraft, the systems management functions allow the operating crew to interact and to monitor the state of the aircraft's systems in situations of normal management, as well as offering warnings and procedures in the case of exceptional situations during flight operations.

During flight operations under normal conditions, the operating crew can follow standard operating procedures and verification checklists in which the standard operations are defined. In order to carry out these standard operations, crew members execute the actions constituting these procedures in a prescribed order using control devices disposed throughout the aircraft cockpit. These control devices are not only situated on control panels located above the crew members, but also on a central console located between the crew members or on panels in the instrument panel.

In emergency situations or exceptional situations such as a system fault, other control devices are dedicated to the management of the aircraft systems in those situations. These control devices contain display devices presenting the actions to be executed by the crew that are necessary for the continued operation of the aircraft in the given exceptional situation.

Currently, there is not a system for assisting the guidance of actions to be carried out by the operating crew whereby the standard and exceptional procedures and controls are centralized into one system. Currently, these control systems are disposed throughout the aircraft instrument panel in such a way that there is no centralized system for assisting the crew in carrying out the necessary actions on the control devices for either normal or exceptional flight situations.

Accordingly, there is a need for systems that would centrally locate the standard and exceptional procedures and controls in one system for ease of operation by the crew. There is also a need for disposing the control devices into one central system location for ease of operation by the crew.

SUMMARY

The subject matter described herein includes systems and computer readable media for providing task guidance for operations management during aircraft flight. In some aspects, the subject matter described herein includes systems and computer readable media for providing task guidance for operations management during normal procedures, or during an abnormal event and/or in the event of a failure having potential impacts on the management of the flight.

According to one aspect, a system for assisting the guidance of actions to be carried out by an operator of an aircraft for the management of systems of the aircraft can be provided. The assisting system can comprise a display unit, a memory unity, and a processor configured to execute an assistance module for guidance of actions for the management of system of the aircraft.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the terms "function", "application", and/or "module" refer to software in combination with hardware and/or firmware for implementing features described herein. In some embodiments, a module may include a field-programmable gateway array, an application-specific integrated circuit, or a processor.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
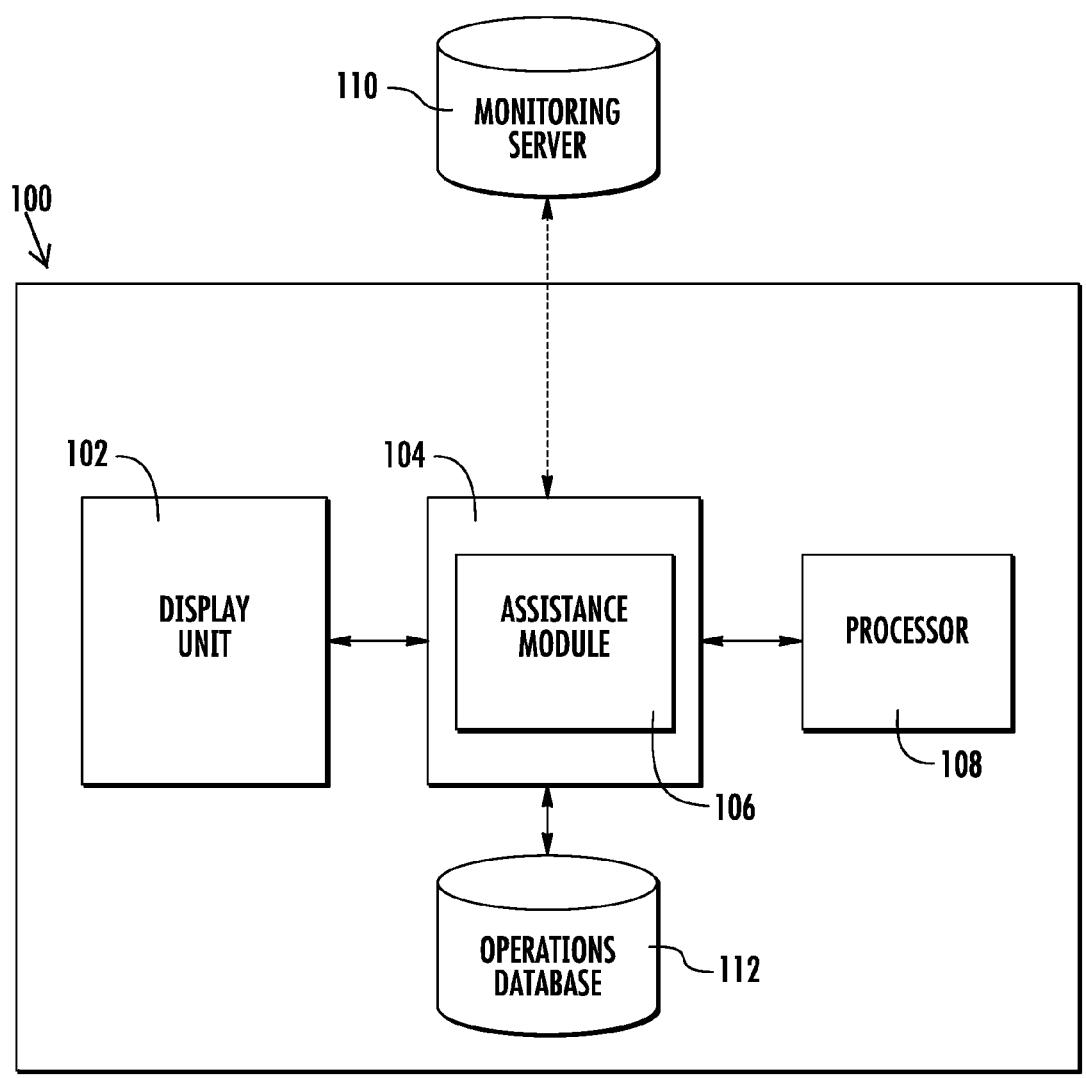
FIG. 1 is a block diagram illustrating an exemplary system for assisting the guidance of actions to be carried out by an operator of an aircraft in accordance with aspects of the subject matter described herein.

In accordance with the description herein and exemplary, associated drawings, novel systems are disclosed for management of aircraft operation systems as carried out by an operator of an aircraft. In one aspect represented in FIG. 1, for example, the present subject matter provides a system generally designation 100 that can be installed on an aircraft, in particular a transport plane. System 100 can comprise a display unit 102 that can be arranged in the cockpit of the aircraft. This display unit 102 can be configured to allow a dialog between at least one operator of the aircraft (e.g. a pilot) and a standard guidance system of the aircraft.

In some aspects the system 100 can also comprise a memory unit 104 and a hardware-based processor 108.

Memory unit 104 can contain one or more software-based or firmware-based modules for execution by processor 108. For example, the memory unit 104 can contain an assistance module 106, which can be configured to display on the display unit at least one possible aircraft flight phase while indicating a current flight phase, at least one operation to be carried out for the current flight phase, and at least one action corresponding to the operation.

In another aspect, the assistance module 106 can be in communication with an aircraft guidance system and can be configured to direct the aircraft guidance system to perform an action associated with the current flight phase.

For example, the assistance module 106 can be configured to communicate with the systems onboard the aircraft that perform an engine start prior to the taxi out phase, allowing the operator to control the engine start function from the display unit 102 that is in communication via a link with the assistance module 106. According to another aspect the assistance module 106 can be configured to communicate with an at least one database server 112 containing the operations and the actions relating to procedures for standard operations, exceptional operations, and additional operations.

Figure 2:
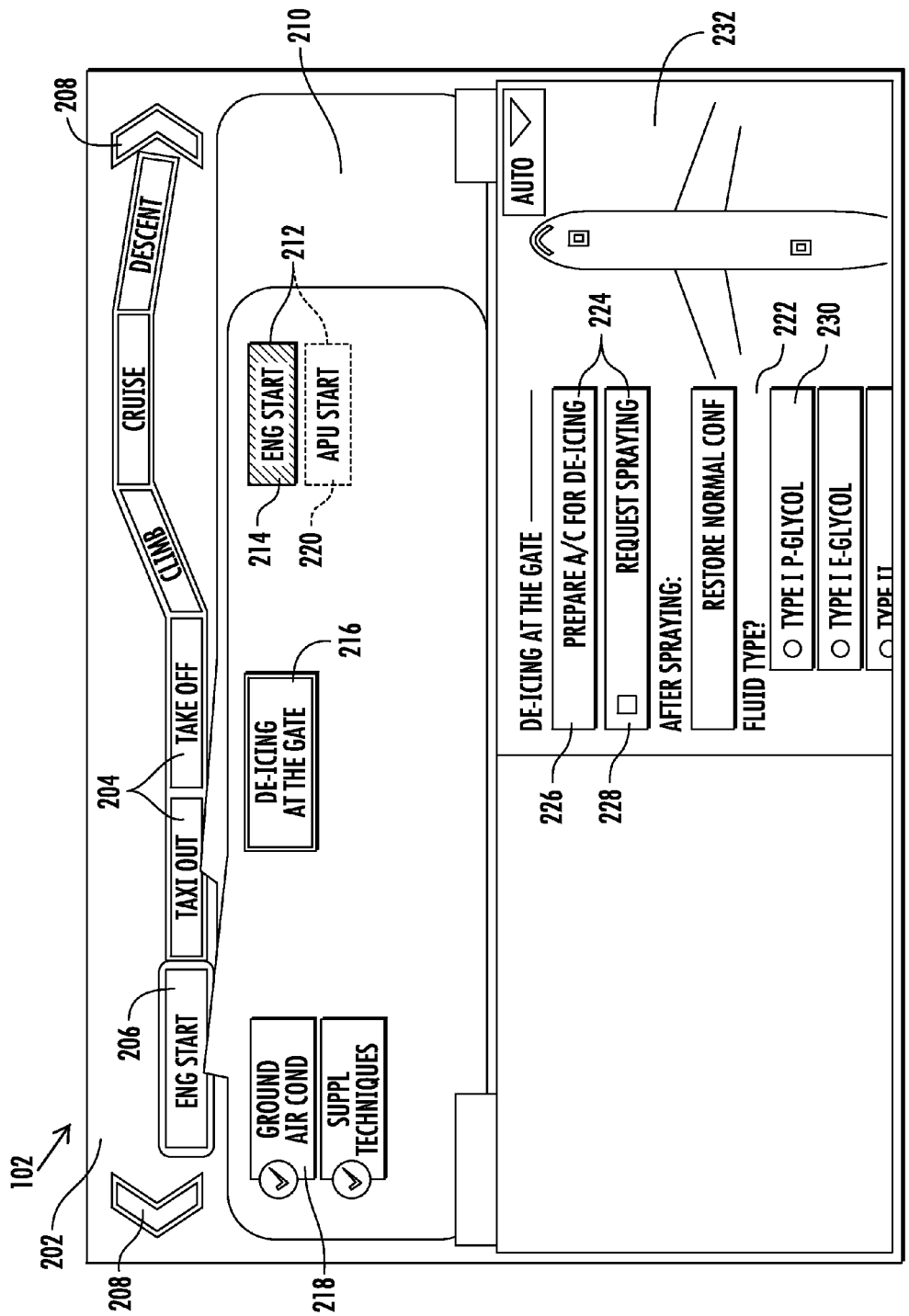
FIG. 2 schematically illustrates a display device showing guidance of actions during a current flight phase of an aircraft during normal operation in accordance with aspects of the subject matter described herein.

In some aspects the display unit 102 can be configured to display at least a first part 202, wherein the possible flight phases can be indicated as graphical indicators 204, as shown in FIG. 2. In some aspects the flight phases can be represented by a series of elongated rectangular graphic indicators 204, joined together one after the other. In some aspects the flight phase captions can be inscribed inside each of the flight phase graphic indicators 204. The series of phases can comprise, for example, at least the following phases: pre-flight, engines start, rollout or taxi out, takeoff, climb, cruising flight, descent, approach, landing, ground rollout or taxi in, parking, and post-flight.

To distinguish the current flight phase, the display unit 102 can be configured to highlight the current flight phase graphic indicator 206 with respect to other indicators. This highlighting can comprise or consist of, for example, illuminating the graphic indicator 206 with a luminous intensity greater than that of the other phase graphic indicators 204, or changing the color of the graphic indicator 206 with respect to the other graphic indicators 204. In some aspects the first part 202 can be configured to display any of the flight phase graphic indicators 204 other than the current flight phase graphic indicator 206, through the operator interacting with indicia 208 disposed on the first part 202. These indicia 208 can be manipulated to display the graphic indicators 204 that may not be visible in the current configuration of the first part 202. In another aspect the assistance module 106 can be configured to allow an operator to select a flight phase displayed on the first part 202 of the display unit 102. The flight phases graphic indicators 204 can be configured to be directly interacted with by the operator using, for example, tactile motions as found with touchscreen capability. This tactile selection could allow the operator to select any flight phase and view the operations and actions associated with that particular phase. The first part 202 of the display unit 102 can also be configured to display basic operational data, in particular data relating to communication with the exterior of the plane or data on takeoff or approach runway. The first part 202 can also be configured to display temporal flight data, such as the scheduled takeoff or landing time.

Figure 3:
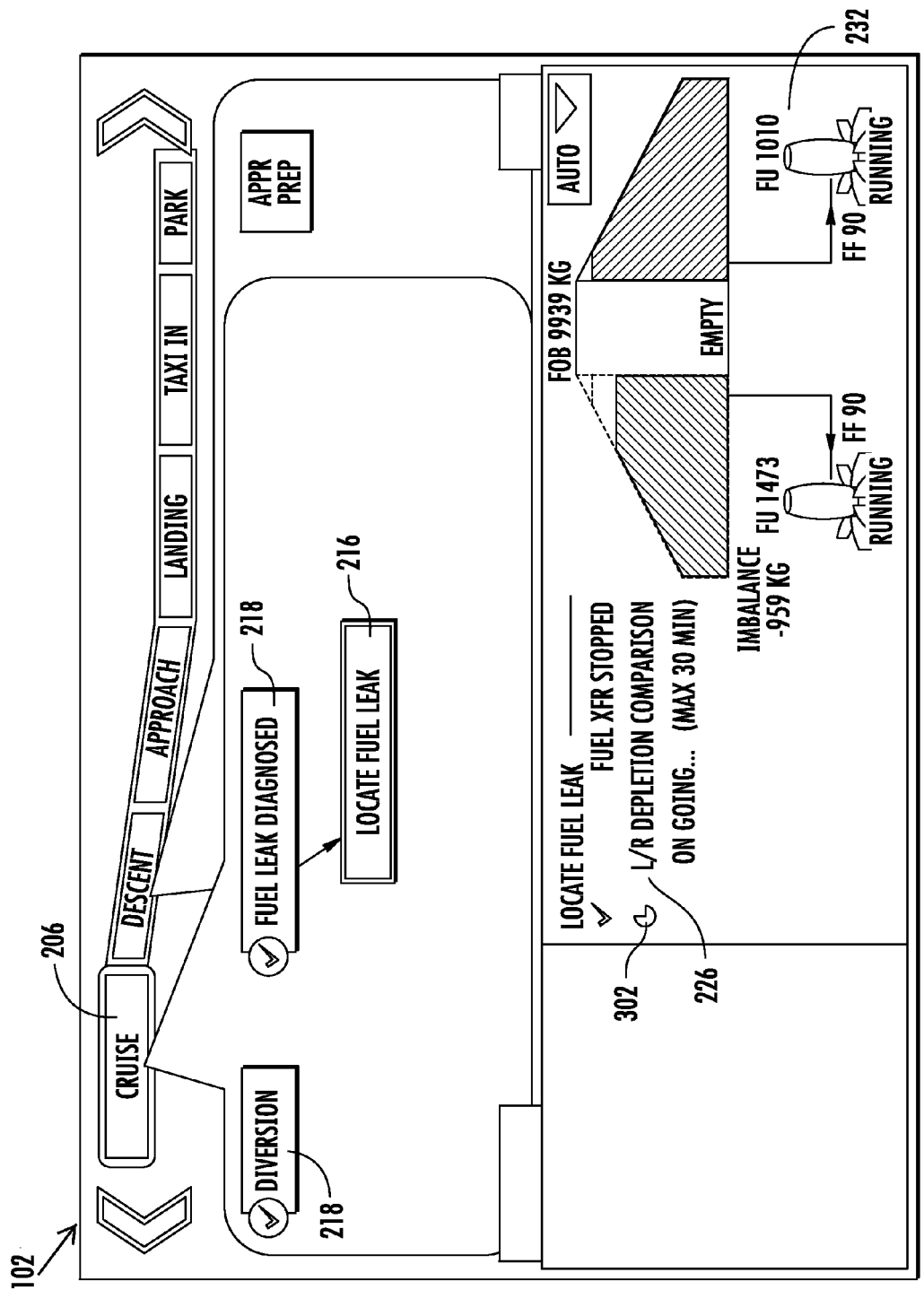
FIG. 3 schematically illustrates a display device showing guidance of actions during a different current flight phase of an aircraft during exceptional operation in accordance with aspects of the subject matter described herein.

In some aspects the display unit 102 can be configured to display a second part 210, wherein a list of operations correspond to the current flight phase indicated by the current flight phase graphic indicator 206 can be displayed as shown in FIGS. 2 and 3. In another aspect, the at least one operation can be displayed on the display unit 102 representatively by rectangular operation graphic indicator 212. In some aspects the operation graphic indicator 204 can comprise a caption of the associated operation inscribed within the graphic indicator.

The operations indicated by the operation graphic indicators 204 can in some aspects be compulsory as a part of the associated flight phase. Such compulsory operations can be determined by normal flight operations guidance from Standard Operating Procedures (SOPs) or Supplementary Techniques, which are generally operational procedures memorized by the operating crew members. The at least one compulsory operation can be configured to display a compulsory operation graphic indicator 214 that is given a particular color or higher luminosity as indication to the operator that this associated operation must be performed during the current flight phase. For example, as shown in FIG. 2, the compulsory operation for the current flight phase "ENG START" would be the operation of "ENG START" indicated as graphic indicator 214.

The assistance module 106 can be configured to allow an operator to select an operation displayed in the second part 210 of the display unit 102, for example using tactile means available with a touchscreen device, and by selecting the operation graphic indicator 212 associated with the desired operation. Where an operation has been selected using the operator graphic indicator 212, it can become the current operation and can be indicated by the current operation graphic indicator 216, which can move to the center of the second part 210 upon selection by the operator, and can be configured to be highlighted with respect to other operation graphic indicators 212. This highlighting can comprise or consist of, for example, in illuminating the graphic indicator 216 with a luminous intensity greater than that of the other operation graphic indicators 212, or changing the color of the graphic indicator 216 with respect to the other graphic indicators 212.

Furthermore, in some aspects the assistance module 106 can be configured to link the currently displayed operation graphic indicators 212 with the currently displayed flight phase indicators 204, such that the selection of a flight phase graphic indicator 204 by the operator could effect a change in the operation graphic indicators 212 displayed in the second part 210 of display unit 102.

In some aspects the second part 210 of display unit 102 can be configured to indicate an at least one completed operation with a completed operation graphic indicator 218, which can be disposed on the left side of the second part 210 of display unit 102. The completed operation graphic indicator 218 can be configured to be highlighted with respect to the other operation graphic indicators 212. This highlighting can comprise of consist of, for example, in illuminating the graphic indicator 218 with a luminous intensity greater than that of the other operation graphic indicators 212, or changing the color of the graphic indicator 218 with respect to the other graphic indicators 212. The completed graphic indicator 218 can also be configured to include some indicia indicating its completed status. These indicia could include a check mark, as shown in FIGS. 2 and 3.

In some aspects the second part 210 of display unit 102 can be configured to indicate an at least one optional operation corresponding to the current flight phase with an optional operation graphic indicator 220. This inclusion of the optional operations can give the operators an advantage in preparing for operations that may become necessary based on location or context with lessened risk of confusion with compulsory operation, or with discontinuing the reliance on operator memory to recall all possible operations available during aircraft operation.

In some aspects the display unit 102 can be also be configured to display a third part 222, wherein the at least one action corresponding to the current operation and current flight phase can be displayed. The at least one action can be displayed using a rectangular action graphic indicator 224, which can be disposed as a list ordered by a priority determined by Standard Operating Procedures during normal flight operations, or checklists detailing procedures used for abnormal operations. This priority ordering of actions can allow the operators to follow the correct procedures in a see-and-do manner that would not rely on operators to memorize whole sets of procedures and perform them from memory. This presentation of actions in an ordered fashion has the further advantage of allowing the operator to manage the systems of the aircraft in an optimal manner.

The assistance module 106 can be configured to allow an operator to select an action displayed in the third part 222 of the display unit 102, preferably using tactile approaches or means available with a touchscreen device and by selecting the action graphic indicator 224 associated with the desired action. In some aspects, the selection of an action graphic indicator 224 by an operator can affect a reconfiguration of the aircraft systems associated with that action. For example, as shown in FIG. 2, the selection of the action graphic indicator 226 associated with the action "PREPARE A/C FOR DE-ICING" can affect the closing of forward and aft outflow valves in order to waterproof the aircraft for the de-icing operation.

In some aspects the assistance module 106 can be configured to perform sensed actions, such as those actions that include sensors enabling the onboard control systems to determine the status of completeness of the action. For example, the action associated with action graphic indicator 226, "PREPARE A/C FOR DE-ICING", is a sensed action that can be displayed as completed based on the sensory feedback from the outflow valves onboard the aircraft after the action has been performed.

The assistance module 106 can also be configured to perform non-sensed actions, such as those actions that do not include sensors enabling the onboard control systems to determine their status of completeness. For example, the action associated with action graphic indicator 228, "REQUEST SPRAYING", is an action that necessitates an audio or text communication between the aircraft operator and de-icing personnel, and as such does not have a corresponding sensor to determine its completeness. Instead, the completeness of this action can be determined and indicated to the assistance module 106 via the display unit 102 by the operator. In some embodiments the action graphic indicator 228 for a non-sensed action can be configured to include a box or other geometric shape wherein a symbol could be disposed upon further selection by the operator to indicate the completed action.

In some aspects an action could require a selection by an operator from multiple options. An at least one optional action could be indicated on the third part 222 of display unit 102 by an at least one optional action graphic indicator 230 that can use a circle or other geometric shape disposed on the optional action graphic 230 wherein a symbol could be disposed upon further selection by the operator to indicate the determined choice. For example, as shown in FIG. 2, there could be several options of de-icing fluid that could be used during the de-icing operation. The operator could select a choice of fluid by selecting the optional action graphic indicator 230 associated with that particular type of fluid. Again, this centralization of actions can provide the advantage of managing the systems of the aircraft from a high level to a low level of functionality in an optimal and efficient manner.

In some aspects the three parts of the display unit 102 can be linked such that a selection on one screen effects the available options and the status of the options on any of the other screens. For example, by selecting any of the flight phase graphic indicators 204, the operator can view the operations associated with that flight phase as they are depicted by the associated operation graphic indicators 212. Furthermore, the operator can select any of the available operation graphic indicators 212 associated with selected flight phase, and can then view the actions associated with that operation as depicted by the corresponding action graphic indicators 224. This functionality can allow the operator to anticipate future tasks, or to review tasks already performed. This linkage between the three parts of the screen overcomes the problem of lengthy operations with multiple actions that can be difficult for a pilot to execute without the risk of losing the relationships between actions and operations. This linkage provides a clear and managed connection between complex operations and the associated actions in a centralized fashion to reduce possible confusion and errors.

The assistance module 106 can be configured such that an at least one action associated with the selected operation as indicated by the current operation graphic indicator 216 can be automatically executed. This has the advantage of allowing the operator to not concern himself or herself with initiating each and every action, further simplifying their duties, reducing overall workload, and increasing the optimization and efficiency of flight operations.

In one aspect represented by FIG. 2, the third part 222 of display unit 102 can also be configured to include a synoptic display 232, which can schematically depict the aircraft systems associated with the currently selected operation graphic indicator 216. If the actions performed by the operator during the operational procedures detailed by the action graphic indicators 224 require change in aircraft systems configurations and there are sensory data that indicate the status of those systems, the systems statuses can be indicated on the synoptic display 232. For example, as shown in FIG. 2, the outflow valves are show in the synoptic display 232, which shows a view of the aircraft as seen from above. The status of the outflow valves can be indicated as either open or closed on the synoptic display 232, determined by the status of the associated action graphic indicator 224 that closes the outflow valves during de-icing procedures. The synoptic display 232 can be configured to display any number of aircraft systems, as indicated by a different system shown in FIG. 3.

Moreover, the synoptic display 232 can be configured to control the execution of the actions associated with it by directly selecting the corresponding system that appears in the synoptic display 232. This characteristic offers the additional advantage of increased control possibilities to the operator during flight operations, according to his or her preference.

The system disclosed herein has the advantage of centralizing the standard procedures in operation during normal flight, and the exceptional procedures that come into effect during abnormal flight events, within a single system and displayed on a single display unit 102. The display unit 102 can display in particular the list of actions to be performed for the standard operations and the exceptional operations, as well as additional operations related to the particular aircraft specifications. To this end, the aforementioned database 112 can contain the operations and the actions relating to the standard procedures, those relating to the exceptional procedures, and those relating to any additional procedures. The standard operations are the operation performed for all flights, during normal functioning, whereas the exceptional operations are used during abnormal functioning, in the case of a problem, a fault, or when a system of the aircraft is defective.

In some aspects the assistance system can comprise a link with a monitoring server 110 outside the assistance system itself, which delivers information related to the monitoring of the systems of the aircraft. This link with the monitoring server allows the detection of faults such that the assistance module 106 can offer operational guidance related to the exceptional procedures to be executed.

FIG. 3 illustrates an embodiment of display unit 102 in the situation of exceptional operations due to fault or failure, particularly the exceptional situation of a fuel leak aboard the aircraft. The monitoring server 110 can detect a fuel leak in the onboard systems and transmits that information to the assistance module 106 via a link between the server and module. This transmitted information can automatically result in triggering a series of operations and associated actions that correspond to the exceptional procedures incurred by the malfunction. Thus, as soon as a problem is detected, the assistance system 100 can immediately propose a course of action to be followed and the operations to be undertaken to resolve the problem, or else place the aircraft in the best flight conditions. This process of automatic proposal for action can results in a completed operation graphic indicator 218 associated with the diagnosed failure, and a new active operation highlighted and indicated by an updated current operation graphic indicator 216, which is linked to the previously completed operation graphic indicator 218. The synoptic display 232 can also dynamically update to display the malfunctioning system, as shown in FIG. 3 as the onboard fuel systems. In some aspects the synoptic display 232 can provide information regarding the current status of the system, including details of the failure. FIG. 3 shows the fuel remaining in the system, the fuel imbalance between tanks, the fuel flow rate, and the engine status, as an example. FIG. 3 also illustrates in an embodiment that the current action graphic indicator 226 can be configured to display a status indication while the action is ongoing or incomplete. In particular, FIG. 3 shows the action "L/R DEPLETION COMPARISON" with a status of "ONGOING (MAX 30 MIN)" and a small symbol indicator 302 to illustrate the ongoing nature of the action.

While the aircraft guidance assistance systems and computer readable media have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A system for assisting guidance of actions to be carried out by an operator of an aircraft, the system comprising:
a display unit;
a memory unit; and
a processor configured to execute an assistance module for guidance of actions for the management of systems of the aircraft;
wherein the assistance module is configured to display on the display unit a single display screen that displays, at a same time, at least one possible aircraft flight phase in a first part of the single display screen and at least one current flight phase in the first part of the single display screen, at least one operation to be carried out for the at least one current flight phase in a second part of the single display screen, and at least one action corresponding to the at least one operation in a third part of the single display screen.

2. The system of claim 1, wherein the single display screen displays:
a display of at least one operation to be carried out for the possible flight phase; and
a display of an at least one action to be carried out for the operation of the possible flight phase as selected by the operator.

3. The system of claim 2, wherein the display unit is configured to display operational data.

4. The system of claim 3, wherein the display unit is configured to display operational data comprising data related to communication with guidance systems exterior to the aircraft.

5. The system of claim 2, wherein the display unit is further configured to allow the operator to consult the at least one operation associated with the at least one flight phase other than the current flight phase.

6. The system of claim 2, wherein the display unit is further configured to display a schematic representation of the systems of the aircraft, the displayed systems corresponding to the actions of the selected operation.

7. The system of claim 2, wherein the display unit comprises an interactive touchscreen display, which is configured to allow the selection of the operations, the actions, the flight phases, or the schematic representation by the operator.

8. The system of claim 1, wherein the assistance module is further configured to display standard operations, exceptional operations, and additional operations.

9. The system of claim 8, wherein the assistance module further comprises at least one database containing operations and actions relating to procedures for standard operations, exceptional operations, and additional operations.

10. The system of claim 9, wherein the assistance module is further configured to affect automatic execution of the action corresponding to the operation selected by the operator.

11. The system of claim 1, wherein the assistance module is further configured for the selection of an operation which is displayed on the display unit.

12. The system of claim 11, wherein the assistance module is further configured to display at least one verification controller for checking the execution of the action, and is configured to indicate the executed action on the display unit.

13. The system of claim 1, wherein the assistance module is further configured to display the selected operation and the at least one action associated with the selected operation in an order of priority.

14. The system of claim 1, wherein the assistance module is further configured to display at least one controller on the display device which is associated with the action to be carried out for the operation and which is configured to control the execution of the associated action by the operator.

15. The system of claim 1, wherein the assistance module is further configured to automatically display an at least one exceptional operation to be implemented in the case of a defective system or an abnormal situation.

16. The system of claim 15, wherein the assistance module is further configured to facilitate control of the execution of the at least one action by the selection of the corresponding system displayed on the schematic representation.

17. A non-transitory computer readable medium comprising computer executable instructions embodied in a computer readable medium that when executed by a processor of a computer control the computer to display on a display unit a single display screen that displays, at a same time:
- at least one possible aircraft flight phase in a first part of the single display screen;
- at least one current flight phase in the first part of the single display screen;
- at least one operation to be carried out for the at least one current flight phase in a second part of the single display screen; and
- at least one action corresponding to the at least one operation in a third part of the single display screen.

* * * * *